Dec. 15, 1953 R. C. MACOMBER 2,662,272

MANUFACTURE OF FABRICATED JOISTS

Filed Feb. 15, 1949 4 Sheets-Sheet 1

INVENTOR.
Robert C. Macomber
BY
Frease and Bishop
ATTORNEYS

Dec. 15, 1953 R. C. MACOMBER 2,662,272

MANUFACTURE OF FABRICATED JOISTS

Filed Feb. 15, 1949 4 Sheets-Sheet 2

INVENTOR.
Robert C. Macomber
BY
Fraser and Bisley
ATTORNEYS

INVENTOR.
Robert C. Macomber
BY
Frease and Bishop
ATTORNEYS

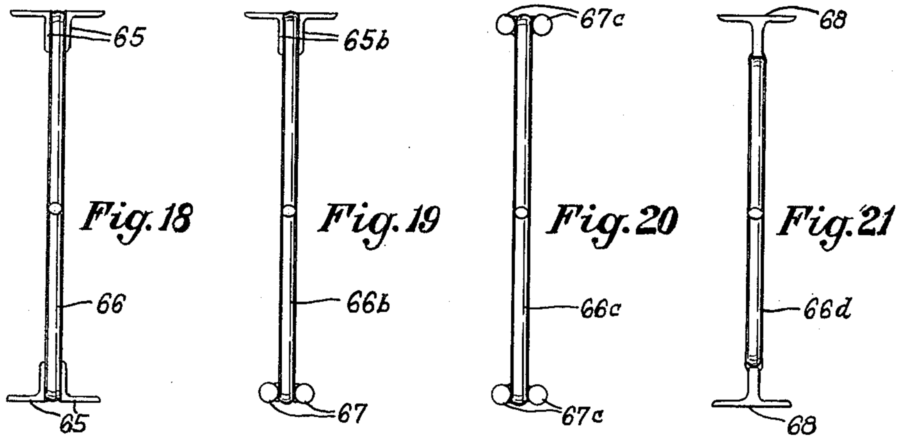
Fig. 18, Fig. 19, Fig. 20, Fig. 21
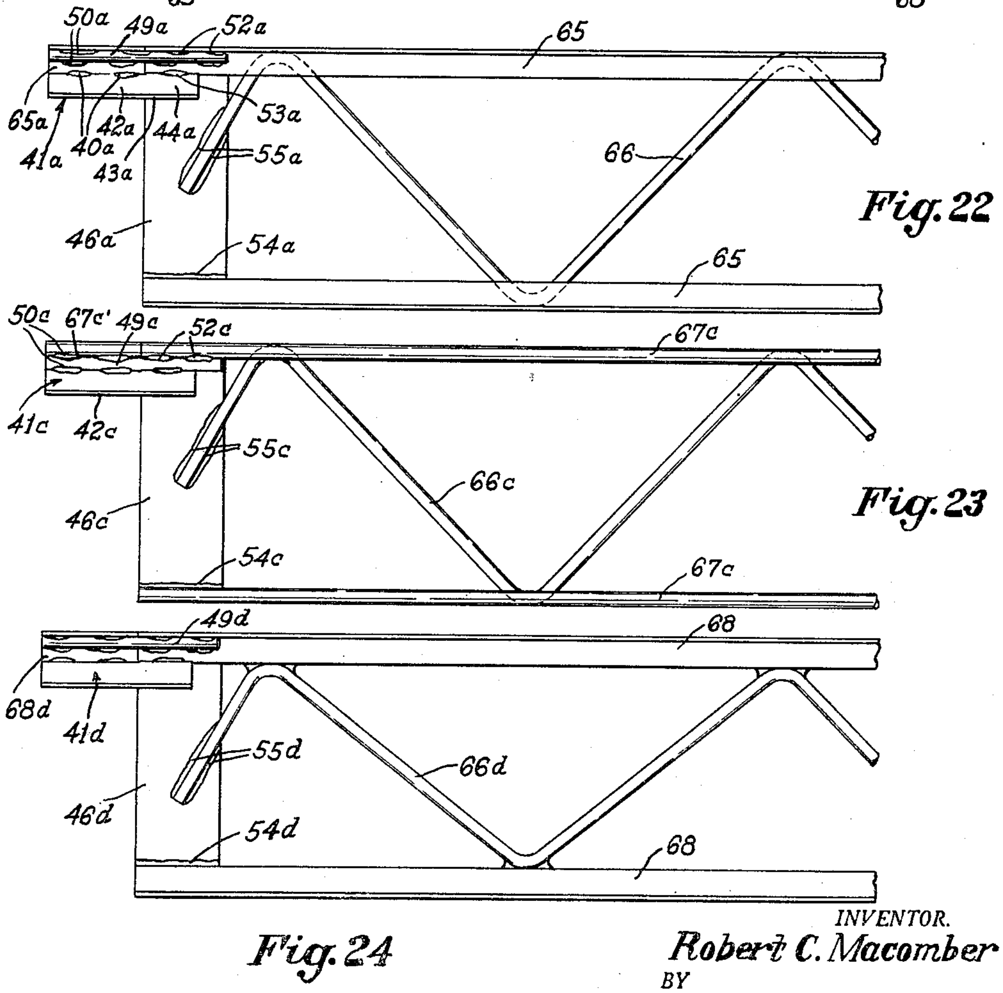
Fig. 22, Fig. 23
Fig. 24
INVENTOR.
Robert C. Macomber
BY
Fraser & Bisley
ATTORNEYS

UNITED STATES PATENT OFFICE 2,662,272

MANUFACTURE OF FABRICATED JOISTS

Robert C. Macomber, Canton, Ohio, assignor to Macomber, Incorporated, Canton, Ohio, a corporation of Ohio Application February 15, 1949, Serial No. 76,505

5 Claims. (Cl. 29—155)

Figure 1:
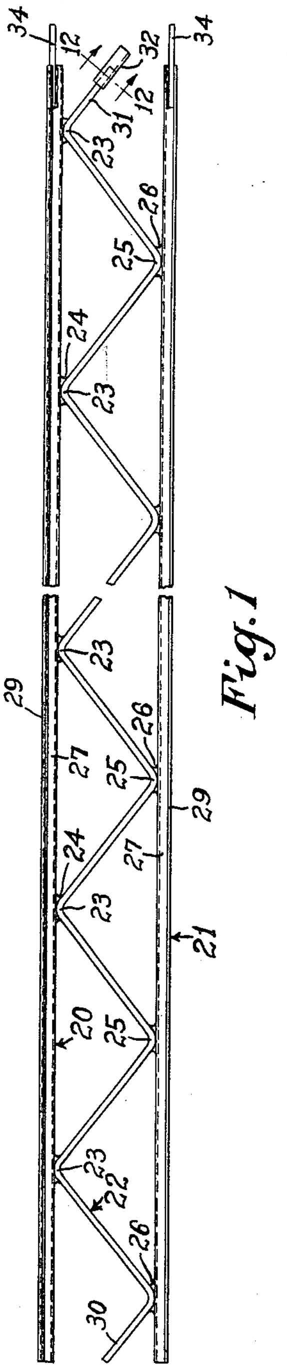

The invention relates to fabricated steel joists in which the upper and lower chords comprise structural members, preferably of tubular or V-shape, connected together in vertically spaced relation by a web member in the form of a continuous bar, reversely bent to form a successive series of oppositely directed V's, the upper and lower angles of which are welded to the upper and lower chords. The upper chord, of such joists as are in general use, is generally of greater length than the lower chord and bearing plates are connected thereto, and opposite ends of the web bar are extended angularly upward from the ends of the lower chord and connected to said bearing plates.

In the manufacture of these joists the structural members, from which the chords are formed, are rolled or otherwise produced of considerable but indefinite length, depending of course upon the length of the strips from which they are formed. As the joists are formed to a predetermined length as required for the particular span, pieces of these structural members are first cut of desired length to form the top and bottom chords of the joist, and then a bar of proper length is bent to form the web of the joist, and welded to the top and bottom chords and to the bearing plates which are attached to opposite ends to produce a finished fabricated joist.

Owing to the fact that under present practice such joists are made up to the required size, as ordered, and because of the length of time required to send an order to the factory, put it through engineering and list into the plant for manufacturing the particular joists, there are many small jobs, such as homes, where such joists could be used, but because of the delay in obtaining the joists in this manner the prospective purchaser cannot or will not wait the time required for their delivery, so that a large market for joists cannot be served by the manufacture of fabricated joists as now produced at the factory.

The present invention contemplates a method of manufacturing fabricated joists to take care of this market, by stocking partially completed products in principal centers and providing means for quickly and economically constructing finished fabricated joists therefrom, of any required length and size.

This is not practical with the present type of fabricated joists as it would require an enormous investment to carry a complete stock of all of the different lengths of the various sizes of joists. This can be done however by furnishing to the warehouses in principal centers, long lengths of the fabricated interior portions of each size of joist, to be cut into the lengths required for a job and readily formed into finished joists of desired size. In so cutting these long lengths into the length required for the particular job, there would be shorter pieces left over, running up to nearly the normal lengths used for joists, which would result in a costly scrap loss unless these shorter lengths could be used.

The present invention therefore contemplates the manufacture of fabricated joists in a manner which will overcome any considerable waste of material by economically producing the fabricated interior portion of joists in long lengths so that the warehousing company can complete the fabrication of joists with little or no scrap loss or waste of material.

This is accomplished by taking two structural members of great length and connecting them in parallel spaced relation by means of a web bar, and providing means at one end of the trussed product thus produced for attachment to the opposite end of a similar trussed product. Then, starting at the other end of said trussed product, lengths are cut therefrom as desired for forming a fabricated joist, and vertical end supports with bearing plates for square end finished joists or underslung assemblies for completed underslung joists are welded to the opposite ends thereof, producing a finished fabricated joist for any required span length.

When the remaining end of the trussed product is too short to form another joist, it is welded to the opposite end of a similar trussed product, and the same is then cut into the desired lengths to form joists as above described.

It is an object of the invention to provide for economically producing fabricated joists of desired length.

Another object is to provide for the production of fabricated joists in a manner which practically eliminates any waste of the material from which the joists are made.

A further object is to furnish warehousing companies with the fabricated parts from which either square end or underslung joists may be completed with very small expense, and no waste of material, and delivered to the customer within a few hours.

A little further object is to provide for the manufacture of fabricated joists by first forming a trussed structure of in definite length comprising spaced, parallel upper and lower chords connected by a web bar, and then cutting said trussed structure in pieces of desired length and attaching vertical end supports with bearing plates for square end finished joists, or underslung end assemblies for completed underslung joists, to the opposite ends thereof, producing a finished fabricated joist for any required span length.

Another object is to provide means at one end of each of the trussed products of indefinite length, for connection to the opposite end of a similar trussed product.

A further object of the invention is to provide a novel fabricated joist comprising spaced, parallel upper and lower chords of equal length, connected by a reversely bent web bar, and a novel type of bearing plate device connected to each end thereof.

Still another object is to provide such a fabricated joist in which the bearing plate device includes a plate welded to both chords.

A further object is to provide such a fabricated joist in which the bearing plate devices are so attached as to provide an underslung joist.

A still further object is to provide for attaching the bearing plates on the underside of the lower chord of the joist, to produce a square end joist.

Another object is to generally improve and simplify the manufacture of fabricated joists.

Figure 2:
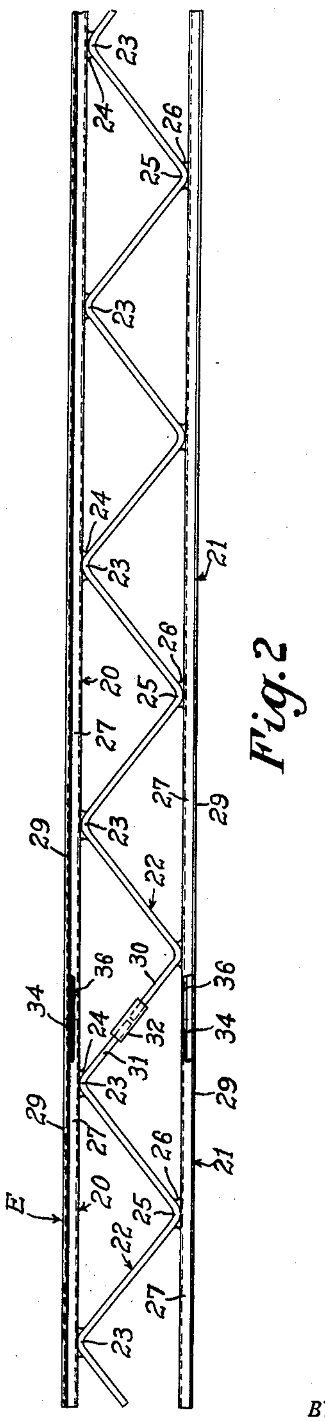
Figure 3:
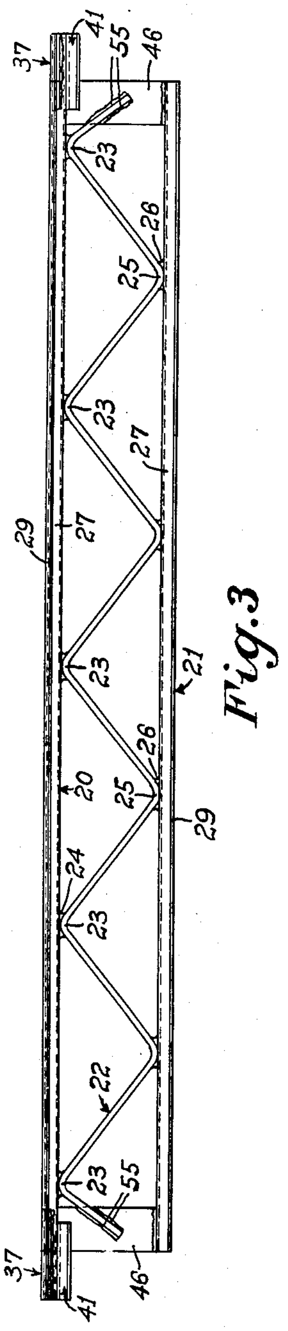
Figure 4:
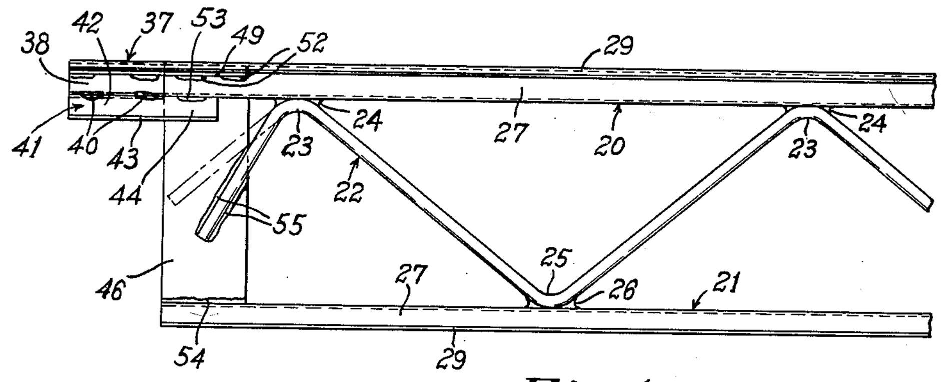
Figure 5:
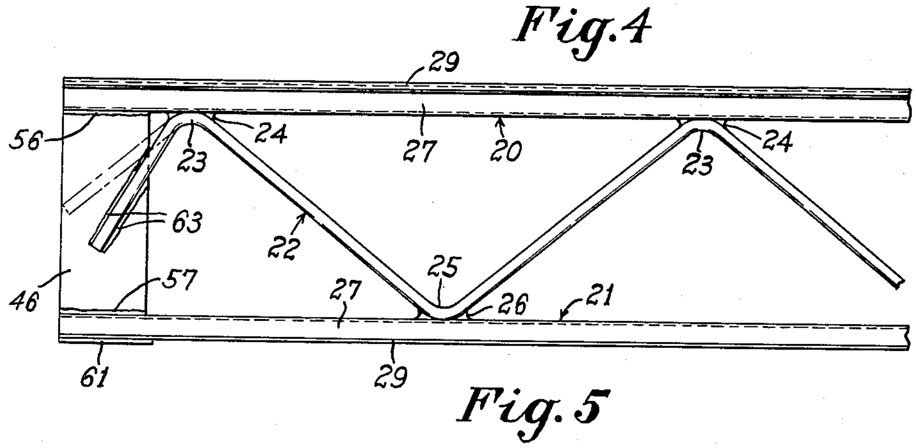
Figure 6:
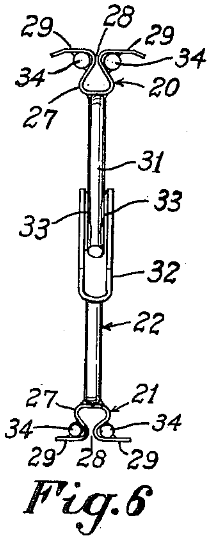
Figure 7:
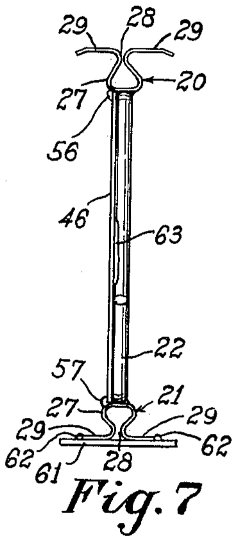
Figure 8:
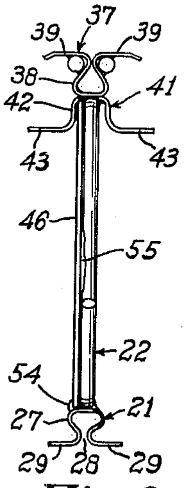
Figure 11:
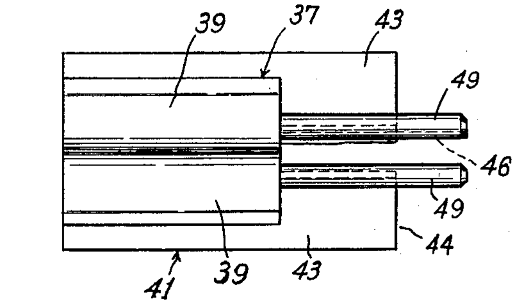
Figure 9:
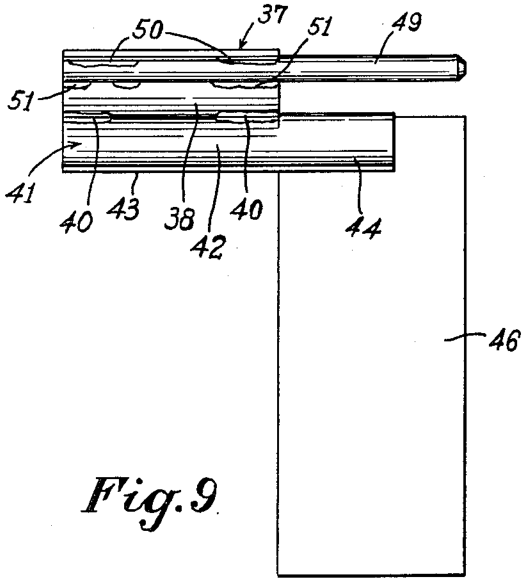
Figure 10:
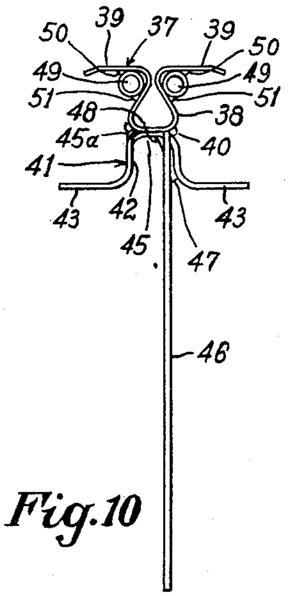
Figure 13:
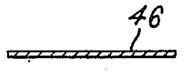
Figure 16:
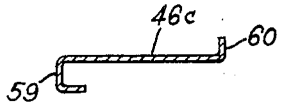
Figure 12:
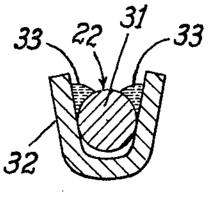
Figure 14:
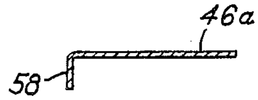
Figure 17:
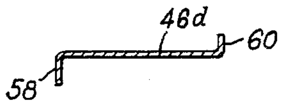
Figure 15:
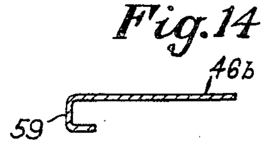

The above and other objects, apparent from the drawings and following description, may be attained, the above described difficulties overcome and the advantages and results obtained, by the construction, arrangement and combinations, subcombinations, parts and methods which comprise the present invention, a preferred embodiment of which, illustrative of the best mode in which applicant has contemplated applying the principle, being set forth in detail in the following description and illustrated in the accompanying drawings, in which:

Figure 1 is a side elevation of a trussed product of indefinite length, constructed for the manufacture of the improved fabricated joists by the method to which the invention pertains;

Fig. 2 a side elevation of the prepared end of such a product attached to the opposite end of a similar product;

Fig. 3 a side elevation of an underslung, fabricated joist constructed in accordance with the invention;

Fig. 4 an enlarged, fragmentary side elevation of one end portion of an underslung fabricated joist made in accordance with the invention;

Fig. 5 a similar view of a square end fabricated joist made in accordance with the invention;

Fig. 6 an enlarged end elevation of the prepared end of the trussed product from which the joists are made, looking toward the right hand end thereof as viewed in Fig. 1;

Fig. 7 an end elevation of the bottom bearing joist such as shown in Fig. 5;

Fig. 8 an end elevation of the underslung joist such as shown in Figs. 3 and 4;

Fig. 9 a detached side elevation of the bearing plate attachment for an underslung joist, on a still larger scale;

Fig. 10 an end elevation of the bearing plate attachment shown in Fig. 9;

Fig. 11 a top plan view of the bearing plate attachment shown in Figs. 9 and 10;

Fig. 12 an enlarged, detail section through the end portion of the web bar and the splice sleeve thereon, taken as on the line 12—12, Fig. 1;

Fig. 13 a transverse sectional view through a flat plate such as used in the bearing plate attachment;

Fig. 14 a similar view of a modified form of such plate, with an angular flange at one side edge, adapted for use in connection with the bearing plate attachment for a standard joist, as shown in Fig. 5;

Fig. 15 a transverse sectional view of another modification of such plate having a channel formed at one side edge;

Fig. 16 a similar view of a still further modification of such plate having a channel formed at one edge, and an angular flange at the opposite edge;

Fig. 17 a transverse section of such a plate having an angular flange at each side edge;

Fig. 18 an end view of a modified form of the trussed product, in which both the top and bottom chords thereof comprise a pair of angle irons;

Fig. 19 another modification of the trussed product in which the top chord comprises a pair of angle irons and the bottom chord a pair of bars;

Fig. 20 still another modification in which both the top and bottom chords comprise a pair of bars;

Fig. 21 a still further modification in which T-sections form both the top and bottom chords;

Fig. 22 a fragmentary side elevation of one end portion of an underslung fabricated joist formed from a trussed product such as shown in Fig. 18;

Fig. 23 a view similar to Fig. 22, in which an underslung joist is formed from the trussed product shown in Fig. 20; and Fig. 24 a similar view of one end portion of an underslung joist formed from the trussed product shown in Fig. 21.

In manufacturing fabricated joists in accordance with the present invention, a trussed product of considerable length is first formed as shown in Fig. 1. This trussed product comprises the top and bottom chords 20 and 21 respectively, which may be of any suitable cross-sectional shape such for instance as the substantially V-section form as shown in Macomber Patent No. 2,457,250 of December 28, 1948, connected in spaced parallel relation by a reversely bent web rod or bar 22 formed into a successive series of oppositely directed V's, the upper angles 23 of which are connected to the top chord 20, as by welding indicated at 24, and the lower angles 25 of which are similarly connected to the lower chord 21, as indicated at 26.

The top and bottom chords 20 and 21 respectively are of equal length, as shown in Fig. 1, and the trussed product thus produced is of indefinite length, preferably the maximum length which may be handled for transportation and storage.

The structural members 20 and 21, forming the top and bottom chords of this trussed product, may be rolled or otherwise formed from a strip or sheet of metal of indefinite length and of desired gauge and width to form structural members of desired cross sectional shape, as shown in the drawings, and the upper chord 20 is preferably of greater cross sectional dimensions than the lower chord 21.

Each of these structural members may be formed in the manner disclosed in the above mentioned Macomber patent, the central portion of the strip being formed to substantially an inverted V or triangle, as indicated at 27, preferably having a central slot or groove 28 formed at the apex of the V or triangle, the metal of the strip being then bent outwardly in opposite directions from said slot or groove, forming the oppositely disposed lateral flat flanges 29, all of which is best shown in Figs. 6 and 7.

The width of the slot or groove 23 may be held to a definite spacing, by welding or riveting at spaced intervals, as disclosed in said Macomber patent, which also assists in stiffening and reinforcing the structural member.

The ends of the trussed product shown in Fig. 1 are so formed that the opposite ends 30 and 31 of the web rod or bar 22 terminate at points substantially half way between the top and bottom chords 20 and 21, one end of the web rod being upwardly disposed as at 30 and the opposite end thereof being downwardly disposed as at 31.

A channel shape splice sleeve 32 is mounted upon the end portion 31 of the web bar 22, as by welds 33, substantially one-half of said splice sleeve extending outward beyond the end of the web bar, as shown in Figs. 1, 6 and 12.

When it is desired to form fabricated joists from the trussed product above described, starting at the left hand end of said product, as viewed in Fig. 1, a piece is cut therefrom of the length necessary for the particular joist to be made, and bearing plate attachments, as will be later described, are attached to the opposite ends of the length of the trussed product, forming a fabricated joist of the required length.

When the trussed product has been cut down so that the remaining end portion thereof is not of sufficient length to form another joist, this end portion, as indicated at E in Fig. 2, is attached to the opposite end portion of a similar trussed product as shown in said figure, by putting the two ends together and welding the protruding ends of the splice bars 34 to the adjacent end portion of the upper and lower chords 20 and 21 on opposite sides of the apices of the V sections, as indicated at 36, and by welding the end 30 of the web bar or rod of the new full length trussed product into the protruding end of the splice sleeve 32, as shown in Fig. 2.

Then starting from the left hand end of the composite product as viewed in Fig. 2, the desired lengths may be cut therefrom to form fabricated joists of any required length.

In order to form an underslung joist, as shown in Fig. 3, bearing plate attachments, such as shown in detail in Figs. 9, 10 and 11, are attached to opposite ends of the joist section. Each of these bearing plate attachments comprises a short length of V-section structural member similar to the top chord 20, indicated generally at 37, and comprises a triangular or V-portion 38 with the out-turned lateral flat flanges 39, the bottom of which is welded as at 40 to a bearing plate, indicated generally at 41.

This bearing plate may be rolled or otherwise formed from a strip or sheet of metal of desired gauge and weight and comprises the central, inverted channel portion 42 and the out-turned horizontal flanges 43.

The bearing plate 41 is of greater length than the V-section 37 and extends some distance beyond one end thereof as indicated at 44, and the top wall of the channel portion 42 thereof is cut out throughout the length of this extending portion, as indicated at 45 and an upturned lip 45a is formed at one side of said cut-out portion to provide a better welding condition.

An elongated, flat, vertical plate 46 has its upper end connected to the inside of this extension 44 of the bearing plate by welding, as indicated at 47 and 48. A pair of splice bars or rods 49 are located on opposite sides of the apex of the triangle or V-portion 38 of the section 37, beneath the lateral top flanges 39 thereof, and are welded to said section, as indicated at 50 and 51, these splice bars extending beyond the end of the section 37 above the extension 44 of the bearing plate member.

In order to form an underslung, fabricated joist, one of these bearing plate attachments, as shown in Figs. 9 to 11, is attached to each end of the section cut from the trussed product as above described, in the manner shown in Figs. 3 and 4.

The end of the V-section 37, from which the splice bars 49 extend, is butted against the end of the top chord 20 and the splice bars 49 are received on opposite sides of the apex of the triangle or V-portion thereof and beneath the top flanges 29 thereof and are welded to said top chord as indicated at 52.

The extension 44 of the channel portion of the bearing plate may be welded to the top chord 20, as indicated at 53, and the lower end of the plate 46 is welded to the top of the lower chord 21, as indicated at 54.

The adjacent end of the web bar 22 is welded to the plate 46, as indicated at 55, and if this adjacent end of the web bar extends downward, as shown in Figs. 3 and 4, it is preferably bent down to such an angle that it is directed toward the end of the lower chord, as best shown in Fig. 4, and then welded to the plate 46.

It should be understood on the other hand that if this adjacent end of the web bar extends upward it should be bent so as to be directed toward the end of the upper chord 20 and then welded to the plate 46 in the same manner. By connecting one of these bearing plate attachments to each end of the piece cut from the trussed product, an underslung joist is provided, as shown in Fig. 3.

If it is desired to produce a square fabricated joist, as indicated in Figs. 5 and 7, a vertical plate 46 may be welded at its upper and lower ends to the bottom and top chords 20 and 21 as indicated at 56 and 57 respectively.

If desired, instead of using the plate such as shown at 46, any of the cross sectional shape of plate as indicated at 46*a*, 46*b*, 46*c* and 46*d* in Figs. 14 to 17 inclusive, may be substituted for the plate 46, these plates being provided with angular flanges 58, or channel flanges 59, at one edge and if desired narrow angular flanges 60 may be provided at the opposite edge thereof to further strengthen the structure.

Since these vertical plates are all in compression the bending of the plates to form the various flanges or channels, as shown in Figs. 14 to 17 stiffens the plates and permits the use of thinner material.

It should be understood that instead of using these vertical plates for connecting the top and bottom chords at each end of the joist, round bars or other structural shapes may be used for this purpose, although the plate is preferable as it standardizes the fabricating and takes care of all web conditions.

A flat bearing plate 61 may, if desired, be welded to the underside of the lower chord 21, as indicated at 62. The end of the web rod 22 may be bent as above described and welded to the plate 46 or the equivalent plates 46*a*, 46*b*, 46*c* and 46*d*, as the case may be, as indicated at 63. With one of the bearing plate attachments connected to each end of the section of the trussed product, a bottom bearing joist is provided.

Although the improved warehouse joists, as shown in Figs. 1 to 10 and above described, may have V-section top and bottom chords, various other chord sections may be used, without departing from the invention, examples being shown in Figs. 18 to 24.

For instance, as shown in Figs. 18 and 22, the top and bottom chords each may be formed of a pair of angle irons, indicated at 65 in Figs. 18 and 22, these angle iron chord members being welded to opposite sides of the bends of the web bar 66. The trussed product made in this manner may be cut into pieces of required length to form joists and an underslung joist may be produced by welding bearing plate attachments to the ends thereof, in the manner shown in Fig. 22.

This bearing plate attachment comprises the channel shape member 41*a*, similar to the bearing plate 41, having the inverted channel portion 42*a* and out-turned horizontal flanges 43*a*. A pair of short sections of angle irons 65*a*, of the same cross sectional shape as the angles 65, and similarly spaced apart, are welded to the top of the channel 42*a*, as indicated at 40*a*, and splice bars 49*a* are welded to the angle members 65*a*, as shown at 50*a*, and are adapted to overlap and be welded to the end portions of the angle members 65, as shown at 52*a*.

The extension 44*a* of the channel portion of the bearing plate may be welded to the top chord angles 65, as indicated at 53*a*, and to the bottom chord angles 65, as indicated at 54*a*. The adjacent extremity of the web bar 66 may be welded to the plate 46*a*, as indicated at 55*a*, all in the manner above illustrated and described in detail.

In Fig. 19 is shown another modification in which the top chord of the trussed product may be formed of a pair of angle irons 65*b*, welded to opposite sides of the upper bends of the web rod 66*b*, and the bottom chord may be formed of a pair of round bars 67, welded to opposite sides of the lower bends of the web bar.

In Fig. 20 is shown another modification, in which both the top and bottom chords may be round bars 67*c* welded to opposite sides of the upper and lower bends of the web bar 66*c*.

As shown in Fig. 23 sections of proper length of such a trussed product may be formed into underslung joists by connecting bearing plate attachments to the ends thereof. These bearing plate attachments are made in the manner as above described, and comprise the channel portion 41*c* having out-turned horizontal flanges 42*c*. Short sections of round bars 67*c'* are welded to the top of the channel member 41*c* and splice bars 49*c* are welded to the bar sections 67*c'* and to the channel member 41*c*, as indicated at 50*c*, and these splice bars may be welded to the adjacent ends of the bars 67*c* as indicated at 52*c*.

The vertical plate 46*c* carried by this bearing plate attachment may be welded to the bottom chord, as indicated at 54*c*, and the end of the web rod 66*c* welded to the plate, as indicated at 55*c*.

In Fig. 21 is shown a further modification in which the top and bottom chords may be formed of T-sections 68 and the web bar 66*d* may be the same as above described. Sections of such a trussed product may be formed into finished fabricated joists by connecting bearing plate attachments to the ends thereof as indicated in Fig. 24. Each bearing plate attachment comprises a short T-section 68*d*, welded to the top of the inverted channel shape bearing plate member 41*d*, and having splice bars 49*d* for attachment as above described, and the vertical plate 46*d* for connection to the bottom chord, as indicated at 54*d*, and to the adjacent end of the web bar 66*d* as indicated at 55*d*.

Square end joists may also be formed from the sections shown in Figs. 18 to 21 by welding vertical plates and bearing plates to the opposite ends thereof in the manner above described in detail.

From the above it will be obvious that fabricated joists may be economically and readily manufactured with substantially no waste of material, and that by this method a novel type of fabricated joist is produced, in which the top and bottom chords are of the same length and are connected at each end by vertical plates to which the adjacent ends of the web rod are bent and welded, and bearing plates attached for providing either underslung or bottom bearing joists as desired.

According to the provisions of the patent statutes, I have explained the principle of my invention and described an embodiment thereof, but I desire to have it understood that within the scope of the appended claims, the invention may be practiced otherwise than as specifically illustrated and described, the invention residing in the method of making fabricated bar joists by cutting pieces of desired length from a trussed product and attaching bearing devices to the ends thereof.

I claim:

1. In a method of making fabricated joists, the combination of the steps which consists in forming a trussed product comprising spaced, parallel, straight upper and lower chords of greater length than required in a finished joist and connected by a reversely bent bar, then cutting the trussed product into pieces of lengths required for finished joists so that each piece comprises spaced, straight, parallel upper and lower chords connected by a reversely bent web bar, and then connecting vertical plates to the end portions of the spaced, straight, parallel upper and lower chords and web bar of each of said pieces to form a plurality of fabricated joists of desired lengths.

2. In a method of making fabricated joists, the combination of the steps which consists in forming a trussed product comprising spaced, parallel, straight upper and lower chords of greater length than required in a finished joist and connected by a reversely bent bar, then cutting the trussed product into pieces of lengths required for finished joists so that each piece comprises spaced, straight, parallel upper and lower chords connected by a reversely bent web bar, and then connecting vertical plates to the end portions of the spaced, straight, parallel upper and lower chords and web bar of each of said pieces, and then attaching bearing plates to the ends of the upper chord of each of said pieces to produce a plurality of fabricated underslung joists of desired lengths.

3. In a method of making fabricated joists, the combination of the steps which consists in forming a trussed product comprising spaced, parallel, straight upper and lower chords of greater length than required in a finished joist and connected by a reversely bent bar, then cutting the trussed product into pieces of lengths required for finished joists so that each piece comprises spaced, straight, parallel upper and lower chords connected by a reversely bent web bar, and then connecting vertical plates to the end portions of the spaced, straight, parallel upper and lower chords and web bar of each of said pieces, and then attaching bearing plates to the ends of the lower chord of each of said pieces to produce a plurality of fabricated square end joists of desired lengths.

4. In a method of making fabricated joists, the combination of the steps which consists in forming a trussed product comprising spaced, parallel, straight upper and lower chords of greater length than required in a finished joist and connected by a reversely bent web bar, then connecting means to one end of the trussed product for attachment to the opposite end of a similar trussed product, then cutting said trussed product from the opposite end thereof into pieces of lengths required for finished joists so that each piece comprises spaced, straight, parallel upper and lower chords connected by a reversely bent web bar, then connecting vertical plates to the end portions of the spaced, straight, parallel upper and lower chords and web bar of each of said pieces to form a plurality of fabricated joists of desired lengths, then attaching said one end of the remainder of said trussed product to the opposite end of a similar trussed product and cutting it into a plurality of pieces of lengths required for finished joists.

5. In a method of making fabricated joists, the combination of the steps which consists in forming a trussed product comprising spaced, parallel, straight upper and lower chords of greater length than required in a finished joist and connected by a reversely bent web bar, then connecting splice bars to the upper and lower chords and a splice sleeve to the web bar at one end of the trussed product for attachment to the opposite end of a similar trussed product, then cutting said trussed product from the opposite end thereof into pieces of lengths required for finished joists so that each piece comprises spaced, straight, parallel upper and lower chords connected by a reversely bent web bar, then connecting vertical plates to the end portions of the spaced, straight, parallel upper and lower chords and web bar of each of said pieces to form a plurality of fabricated joists of desired lengths, then attaching said one end of the remainder of said trussed product to the opposite end of a similar trussed product and cutting it into a plurality of pieces of lengths required for finished joists.

ROBERT C. MACOMBER.

References Cited in the file of this patent

UNITED STATES PATENTS

| Number | Name | Date |
|---|---|---|
| 1,806,639 | Moltzan | May 26, 1931 |
| 1,839,178 | Rebman | Dec. 29, 1931 |
| 1,880,000 | Wallen | Sept. 27, 1932 |
| 1,880,003 | White | Sept. 27, 1932 |
| 1,871,521 | Hodell | Aug. 16, 1932 |
| 1,983,632 | Miller et al. | Dec. 11, 1934 |
| 2,088,120 | Smith | July 27, 1937 |
| 2,111,357 | Cornell, Jr. | Mar. 15, 1938 |
| 2,130,797 | Greulick | Sept. 20, 1938 |
| 2,241,617 | Rubin | May 13, 1941 |
| 2,277,615 | Townsend | Mar. 24, 1942 |
| 2,308,080 | Herr | Jan. 12, 1943 |
| 2,376,574 | Collins | May 22, 1945 |
| 2,542,172 | Wold | Feb. 20, 1951 |
| 2,567,790 | Schaffan, Jr. | Sept. 11, 1951 |